June 25, 1935.  L. M. HARVEY  2,005,783
MOUNTING FOR WIND DEFLECTORS OR THE LIKE
Filed Jan. 27, 1931
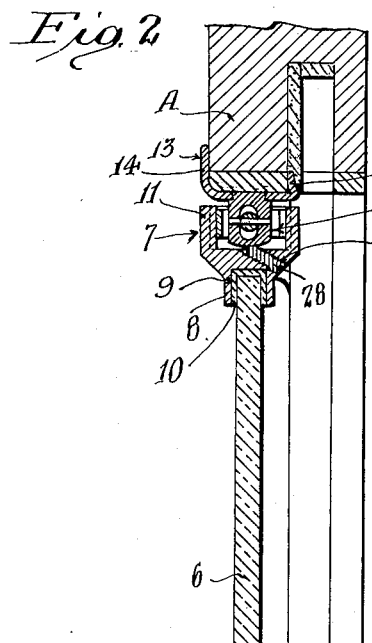
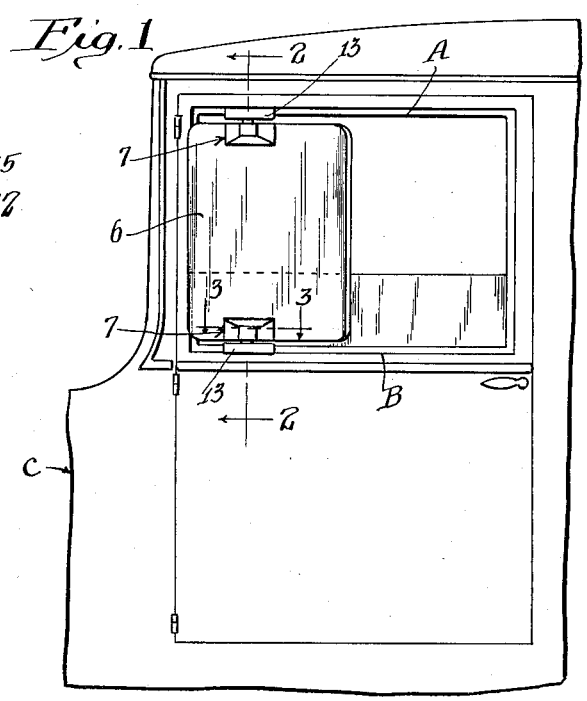
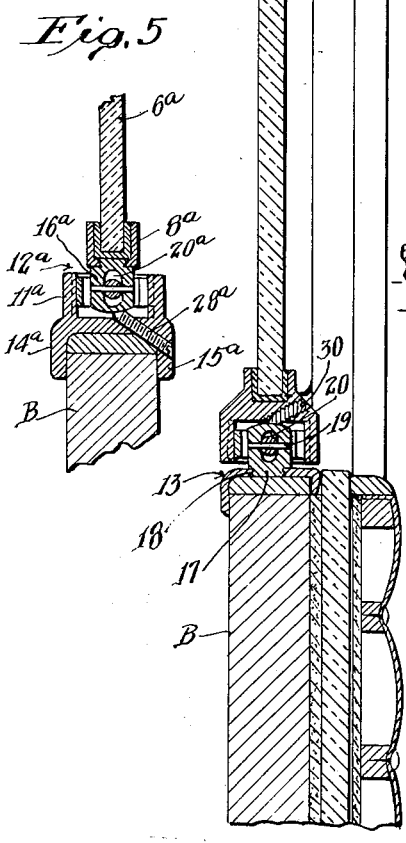
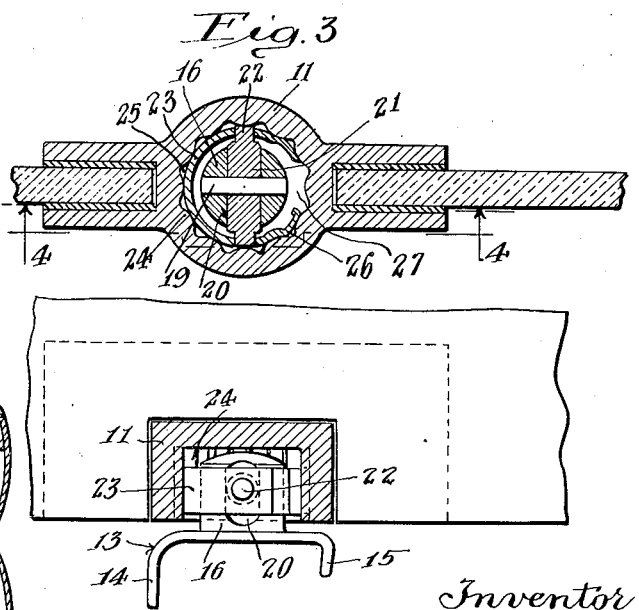
Inventor
Leo M. Harvey
By Lyon & Lyon
attys Patented June 25, 1935

2,005,783

UNITED STATES PATENT OFFICE 2,005,783

MOUNTING FOR WIND DEFLECTORS OR THE LIKE

Leo M. Harvey, Los Angeles, Calif.

Application January 27, 1931, Serial No. 511,529

18 Claims. (Cl. 296—84)

This invention relates to mountings for wind deflectors commonly called wind wings, or the like, and the general object of the invention is to provide a mounting to enable such a deflector or wing to be securely mounted between supporting faces such as the faces of the rails of a window frame; also to provide means for compensating for unparallelism and different angular relations of the lintel and sill of the opening or window in which the wind deflector or similar member is mounted. The unparallelism or faulty alinement of the lintel and sill may be inherent in an automobile when it leaves the factory or it may be later caused by racking of the body after the vehicle has been in use for some time.

Another important object is to provide a universal connection of the wind deflector or the like with the lintel and sill of a door or window opening.

Another object is the provision of a unique ratchet device for holding the wind deflecting member at different angles.

Another important object is to take up end play between the wind deflecting member and the lintel or sill.

Another important object is the provision of a holder for a transparent member, said holder being connected with a saddle plate by a heavy universal joint to permit the transparent member to swing readily for adjustment irrespective of inaccuracies of alinement between the two saddle plates.

Another important object is to make provision for forcing the holders away from the supporting plates or saddles in order to jam the wind wing holders in the window opening, and so as to prevent end play and rattling of the wind deflector.

Another important object is to provide means for frictionally holding a wind deflecting member between the lintels of the door of a motor vehicle, and thereby avoid the necessity for employing screws for fastening it.

Other objects and advantages will appear in the subjoined detailed description.

The accompanying drawing illustrates the invention:

Figure 1 is an outside view of a wind deflector mounting constructed in accordance with the provisions of this invention, the same being shown in position on a vehicle body, which is fragmentarily shown.

Figure 2 is an enlarged fragmental vertical section on the line indicated by 2—2, Figure 1.

Figure 3 is an enlarged fragmental horizontal section on the line indicated by 3—3, Figure 1.

Figure 4 is an elevation of the lower mounting unit, partly in section, on the line indicated by 4—4, Figure 3.

Figure 5 is a sectional view, similar to Figure 2, showing a slightly modified form of mounting for wind deflectors, or the like, embodying the invention.

The wind deflecting member is indicated at 6 and may be of glass or any other suitable material, preferably transparent. The member 6 is connected to the lintel A and sill B of the vehicle body C by mounting units of like construction, each of which is indicated, in general, by the character 7. The mountings 7 are independent of each other. Since the units 7 are alike, it will only be necessary to describe one of them in detail, as follows:

A holder for the member 6 comprises a block form member with a channelled flange 8, the channel being shown at 9 and in said channel felt 10 or other suitable material is provided to securely hold the marginal portion of the member 6 without breakage of said member. The channelled flange fits into an angular notch on the edge of the wing (see Fig. 4), and of course the notches in the two edges should be in alinement with each other. The holder also comprises a bearing in the form of a circular cup or socket 11, and the holder is connected by a universal joint 12, extending into the cup 11, to a saddle or saddle plate 13 provided with flanges 14, 15 that enable the plate to be securely seated on the lintel or sill, as the case may be.

In this instance, the universal joint 12 is of unique construction, there being a stud 16 which has a reduced neck 17 that is expanded or riveted into a hole 18 in the plate 13. A pin 19 extends transversely through the stud or member 16 and extends across an opening in the form of a slot 20 that passes transversely through the stud at right angles to the pin 19. Mounted to rock on the pin 19 and extending through the opening 20 is a shaft 21. The opposite ends of the shaft 21 are of reduced diameter, as indicated at 22, and mounted for free rotation on the reduced ends 22 is a bearing in the form of a yoke or bushing 23 that is relatively rotatable on the axis of the cup 11.

The cup 11 is circular and has a circumferential face, that is formed with convolutions or notches between wide rounded "teeth", as indicated at 24, and the notches 25 are adapted to be selectively engaged by detents 26 on the outer face of the bushing 23. The bushing 23 is preferably not continuous but to increase the spring effect is split at 27, and is of spring material so as to yieldingly hold the detents 26 in engagement with the toothed face of the cup. Thus, the teeth 24 and detents 26 constitute a rudimentary ratchet device for holding the wing yieldingly in any position in which it is left.

The bushing 23 and cup 11 have a friction-tight fit and said bushing is ordinarily entirely housed within the cup 11.

An adjustable means is provided to relatively force the stud 16 and cup from one another and, in this instance, said means comprises a screw 28 threaded into a hole 29 that extends in an inclined direction through the wall of the cup 11. The inner end of the screw 28 engages the free end of the stud 16 at approximately the axis of said stud, while the outer end of the screw, which is slotted at 30, can be engaged by a screw driver for adjustment of the screw in or out. Evidently by tightening up these screws, the saddles can be clamped firmly against the faces of the rails of the window frame.

The unit 7, thus constructed, will be secured in duplicate to the member 6, one to the upper edge of said member and one to the lower edge, as shown in Figure 1. Then, to install the wind deflector in place on the vehicle, the plates 13 will be secured, approximately in vertical alignment, one to the lintel A and the other to the lintel B. To do this the flange 15 of each plate 13 may be bent or crimped inwardly toward the other flange 14, as clearly shown in Figure 2.

If there is too much end play between the studs 16 and cups 11, so that the wind deflector is in danger of rattling loose, one or both of the screws 28 may be turned in a direction to thrust the stud or studs away from the associated cup until the end play is taken up.

It will be seen that the axis of each stud is aligned with the plane of member 6 so that if the stud should tend to thrust against the adjusting screw relatively hard, as might result if the vehicle were running over a rough piece of road, the thrust of the stud is transmitted edgewise to the member 6 and there is therefore no tendency to lateral deflection of the cup 11, which lateral deflection would tend to break the member 6, if said member were of brittle material such as ordinary glass.

After the wind deflector has been mounted in the manner described above, it may be angularly adjusted by pressure exerted against the member 6 tending to rotate said member. When the rotating pressure is sufficient, the detents 26 will be forced out of the inter-tooth spaces that they engage, thus permitting the cups 11 to rotate to a position where the detents 26 will again engage certain of the inter-tooth spaces.

While I at present prefer to construct the universal joints as hereinbefore described, it is to be understood that I may employ any other suitably constructed universal joints for connecting the holders 8, 11 with the plates 13, in order to secure the advantages derivable from use of the invention.

Although I prefer to have both the upper and lower mounting constructed to enable its corresponding stud to be adjusted outwardly, it should be understood that it may not be necessary to have more than one of these studs adjustable because in some cases sufficient adjustment might be made at one mounting to insure the tight clamping of the saddle plates against the faces of the window frame.

In the form of the invention illustrated in Figure 5, the parts that functionally correspond to those hereinbefore described are indicated by the same reference characters, with the addition of the suffix $a$. The only difference between this modified construction and that previously described is that, in this instance, the universal joint 12a has its attaching member 8a secured to the wind deflecting member 6a, while the holder 11a has its attaching members 14a, 15a, secured to the support B.

I claim:

1. A mounting for a wind deflector or the like comprising attaching members securable to supports, holders securable to a wind deflecting member, and means including universal joints connecting the holders with the attaching members, said means including resilient members.

2. A mounting for a wind deflector or the like comprising attaching members securable to supports, holders securable to a wind deflecting member, and means including universal joints connecting the holders with the attaching members, said universal joints including resilient members.

3. A mounting unit comprising attaching means securable to a support, and a holding means securable to a wind deflecting member or the like, one of said means provided with a bearing member and the other with a member rotatably fitting in the bearing member, one of the last two members being split and of spring material.

4. A mounting unit comprising attaching means securable to a support, and a holding means securable to a wind deflecting member or the like, one of said means provided with a bearing member and the other with a member rotatably fitting in the bearing member, one of the last two mentioned members provided with teeth and the other of said last two mentioned members being split and of spring material and provided with a detent to engage between the teeth.

5. A mounting unit for supporting a screen, comprising a universal joint including a member with a circumferential face, a member fitting against the said face for relative rotation therebetween on the axis of the circumferential face, one of the members being split and of spring material, securing means for the universal joint for attaching the same to the screen, and securing means for the second mentioned member for connecting it to a support.

6. A mounting unit for supporting a screen comprising a universal joint including a member with a circumferential face, a member fitting against the circumferential face for relative rotation therebetween on the axis of the circumferential face, one of the members provided with convolutions and the other being split and of spring material and provided with a detent to engage the convolutions, securing means for the universal joint to attach it to the screen, and securing means for the second mentioned member for connecting it to a support.

7. A mounting unit for a deflector comprising a stud provided with a transverse opening, a shaft mounted in said opening, a member mounted to rock on the ends of the shaft, a member fitting around the first mentioned member, a screw in the second mentioned member projecting into engagement with the stud to push the stud outwardly with respect to the second mentioned member, a plate carrying the stud, and securing means for attaching the second mentioned member to the deflector.

8. A mounting unit comprising attaching means securable to a support, and a holding means securable to a wind deflecting member or the like, one of said means provided with a cup form bearing member and the other with a stud rotatably fitting in the bearing member, one of the last two mentioned members being a yielding member, and the cup-form member provided with teeth within the same and the other of said last two mentioned members being provided with a detent to engage between the teeth.

9. A mounting for a wind deflector or the like comprising independent attaching members constructed to seat against the adjacent faces of the upper and lower rails of an automobile window frame, holders securable to a wind deflecting member, means including ratchet devices connecting the holders to the attaching members, and means for adjusting one of the attaching members outwardly with respect to its corresponding holding member to jam the mounting between the said rails.

10. A mounting for a wind deflector or the like comprising attaching members in the form of saddle plates to seat on the faces of the rails of a window frame, independent holders securable in alinement with each other to a wind deflecting member, and means including ratchet devices for adjustment on an axis, connecting the holders with the attaching members, said ratchet devices including resilient members enabling the deflector to be held yieldingly in any set position, and means for moving one of the saddles outwardly with respect to its corresponding holder to jam the mounting between the said rails.

11. In a wind deflector or the like, the combination of a deflector having notches in its opposite edges, a holder received in each notch, a saddle corresponding to each holder for seating against the face of a support, a freely movable universal joint including two connected parts capable of relative rotary movement on two axes substantially perpendicular to each other, said connected parts located between each saddle and its corresponding holder permitting a limited movement of each holder relatively to its corresponding saddle, and means associated with one of said members for engaging the inner end of the member to force its corresponding saddle outwardly and enabling the deflector to be clamped between two substantially parallel faces.

12. In a wind deflector or the like, the combination of a deflector in the form of a glass plate having notches in opposite edges, a holder received in each notch, a saddle corresponding to each holder for seating against the face of a support, a stud rigidly secured to each saddle, a freely movable universal connection between each stud and its corresponding member permitting a limited movement of each holder relatively to its corresponding saddle, and means mounted in at least one of said holders for forcing its corresponding stud outwardly to enable the deflector to be clamped between two substantially parallel faces.

13. In a mounting for mounting a deflector in a window frame, the combination of a saddle adapted to engage the face of the frame, a stud rigidly attached to the saddle, a holder having means for attaching the same to the deflector, said holder having a socket receiving said stud, and having a circumferential face with convolutions, a resilient ring having a universal joint connection with said stud and yieldingly engaging said convolutions so as to permit yielding rotation of said member on the axis of the socket and relatively to said ring, and operating to hold the deflector in any position in which it is set.

14. A mounting unit for supporting a screen, comprising a universal joint including a circular member, a member fitting the circular member for relatively rotation on the axis of the circular member, means for securing the circular member to the screen, and means for securing the second named member to a support.

15. A mounting unit comprising a universal joint, including a circular member, a member fitting the circular member for relative rotation on the axis of the circular member, means for adjustably holding the members against relative rotation, means connected with the circular member for securing the same to the screen, and means for securing the second named member to a support.

16. A mounting unit comprising a pair of attaching means to seat on a support at each end and a holding means in line with the attaching means securable to a wind deflector or the like, at least one of said holding means having a bearing member with a circumferential face disposed about an axis in the plane of the deflector, and the corresponding attaching means having a member fitting in the bearing member relatively rotatable on the axis of the bearing member, and having means for yieldingly engaging said circumferential face, said circumferential face having corrugations for holding the wind deflector at different angles.

17. A mounting unit comprising a universal joint including a circular member in the form of a socket closed at one end and open at its other end, a member fitting into the socket through its open end for relative rotation in the socket, means in the socket for yieldingly resisting relative rotation of the second named member in the socket, means for securing the circular member to the member that is to be mounted, and means for securing the second-named member to a support.

18. A mounting unit comprising a universal joint including a circular member in the form of a socket closed at one end and open at its other end, a member fitting into the socket through its open end for relative rotation in the socket, means in the socket for yieldingly resisting relative rotation of the second named member in the socket, means for securing the circular member to the member that is to be mounted, means for securing the second-named member to a support said socket having circumferentially disposed teeth formed therein enabling the circular member to be held in a plurality of adjusted positions upon its axis of rotation.

LEO M. HARVEY.